(12) United States Patent
Onda et al.

(10) Patent No.: US 11,448,880 B2
(45) Date of Patent: Sep. 20, 2022

(54) VIRTUAL IMAGE DISPLAY DEVICE SHIFTING LIGHT OF AN IMAGE TO CREATE A VIRTUAL IMAGE

(71) Applicant: DENSO CORPORATION, Kariya (JP)

(72) Inventors: Kazuhisa Onda, Kariya (JP); Hiroshi Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 408 days.

(21) Appl. No.: 16/585,854

(22) Filed: Sep. 27, 2019

(65) Prior Publication Data

US 2020/0103652 A1 Apr. 2, 2020

(30) Foreign Application Priority Data

Oct. 1, 2018 (JP) .............................. JP2018-186671

(51) Int. Cl.
*G02B 27/01* (2006.01)

(52) U.S. Cl.
CPC .. *G02B 27/0103* (2013.01); *G02B 2027/0107* (2013.01)

(58) Field of Classification Search
CPC ........ G02B 27/0103; G02B 2027/0107; G02B 2027/0116; G02B 2027/0121
See application file for complete search history.

(56) References Cited

U.S. PATENT DOCUMENTS

| | | | |
|---|---|---|---|
| 4,613,200 A | | 9/1986 | Hartman |
| 5,089,903 A | * | 2/1992 | Kuwayama ........ G02B 27/0103 359/15 |
| 5,898,511 A | * | 4/1999 | Mizutani .................. G03H 1/26 359/13 |
| 2017/0184843 A1 | * | 6/2017 | Kuzuhara .......... G02B 17/0848 |
| 2019/0056588 A1 | * | 2/2019 | Nambara ........... G02B 17/0621 |
| 2020/0319456 A1 | * | 10/2020 | Yatsu ................. G02B 27/0101 |

FOREIGN PATENT DOCUMENTS

| | | |
|---|---|---|
| JP | 04-281422 A | 10/1992 |
| JP | 05-341226 A | 12/1993 |
| JP | H07-285357 A | 10/1995 |
| JP | 2002-031774 A | 1/2002 |

* cited by examiner

*Primary Examiner* — Kwang-Su Yang
(74) *Attorney, Agent, or Firm* — Posz Law Group, PLC

(57) ABSTRACT

A light guide unit forms an optical path to guide a display light emitted from a display unit toward a projection portion. The light guide unit includes a negative optical element and a positive optical element. The negative optical element is placed on the optical path and has a negative optical power. The positive optical element is placed on the optical path and is closer to the projection portion than the negative optical element. The positive optical element has a positive optical power. The positive optical element is a diffractive optical element having a diffractive structure configured to diffract the display light.

8 Claims, 7 Drawing Sheets

VIRTUAL IMAGE DISPLAY DEVICE SHIFTING LIGHT OF AN IMAGE TO CREATE A VIRTUAL IMAGE

CROSS REFERENCE TO RELATED APPLICATION

The present application claims the benefit of priority from Japanese Patent Application No. 2018-186671 filed on Oct. 1, 2018. The entire disclosures of all of the above applications are incorporated herein by reference.

TECHNICAL FIELD

The present disclosure relates to a virtual image display device.

BACKGROUND

Conventionally, a known virtual image display device mounted on a vehicle is configured to project an image on a windshield to indicate a virtual image.

SUMMARY

According to an aspect of the present disclosure, a virtual image display device is configured to be mounted on a vehicle and to cause a projection portion to reflect a display light of an image to display the image as a virtual image to be visible. The virtual image display device comprises a display unit and a light guide unit. The display unit is configured to emit the display light. The light guide unit is configured to form an optical path to guide the display light emitted from the display unit toward the projection portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
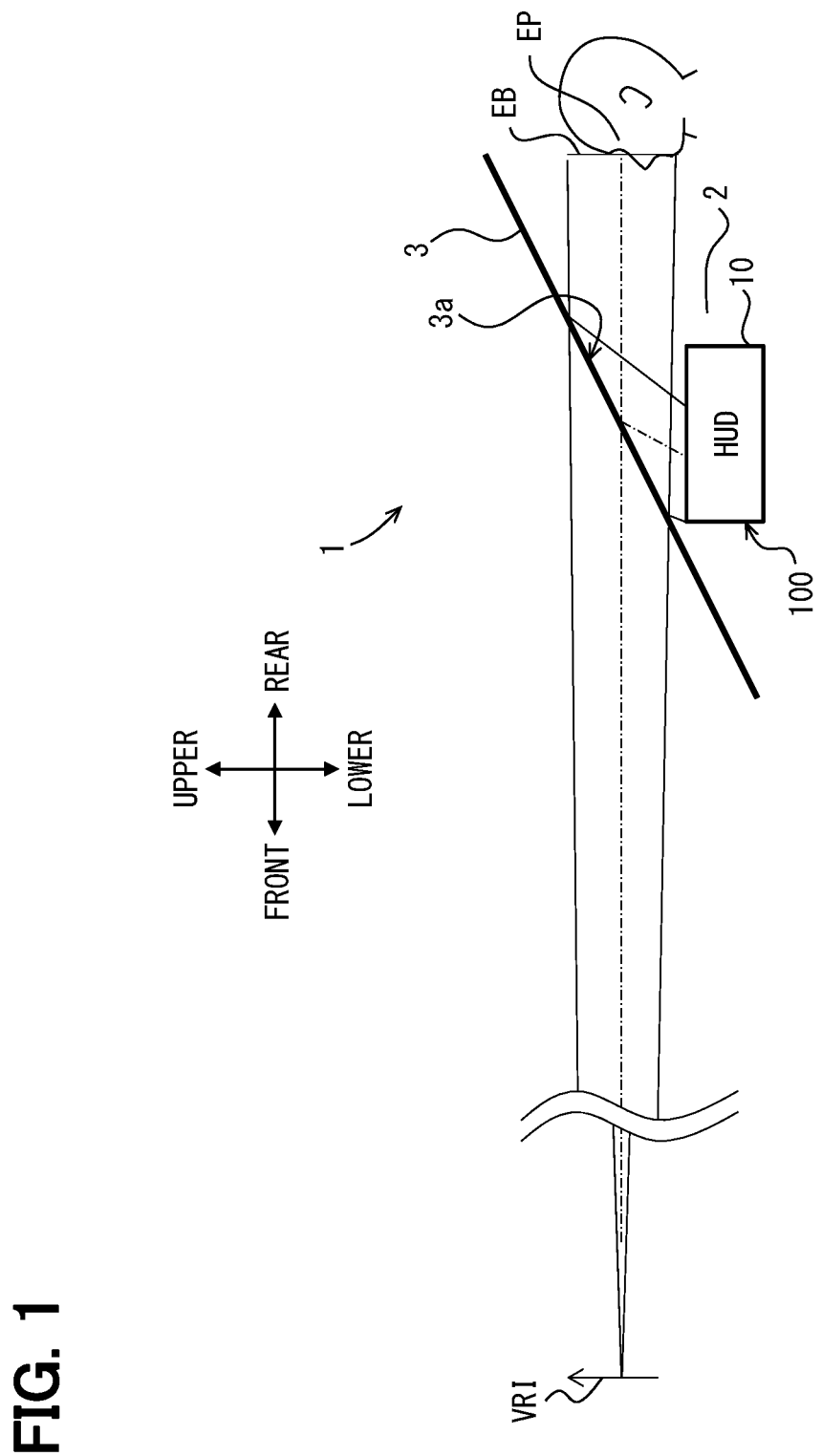
FIG. 1 is a schematic view showing an HUD device mounted on a vehicle according to a first embodiment.

Hereinafter, an example of the present disclosure will be described. A virtual image display device according to the present example is configured to be mounted on a vehicle. The device according to the present example includes a display unit that emits display light of an image and a light guide that forms an optical path for guiding the display light emitted from the display unit toward a projected portion of a windshield. The light guide unit includes a concave mirror having a reflective surface that reflects the display light toward the projected portion. This reflective surface is designed in accordance with a change in a curvature of the windshield.

Vehicles employ various shapes of windshields according to those applications and/or designs. The virtual image display device produces the virtual image by reflecting the display light on the projected part of the windshield. The virtual image display device is mounted on the vehicle. In this configuration, deformation of the image is reduced according to various shapes of windshields, its positional relationship with respect to the windshield, and/or the like, thereby to enhance its visibility. In addition, requirement arises to improve robustness and to increase commonality of designs.

In this respect, in the configuration of the present example, the shape of the reflecting surface or the shape of the concave mirror changes in accordance with the shape of the windshield for each vehicle type. Therefore, according to the difference in the shape of the reflecting surface or in the shape of the concave mirror, requirement arises to change the shape of its case or to change the arrangement and/or the shape of other components. Therefore, its robustness is not necessarily high. Requirement arises to change the shape of the case or to change the arrangement and/or the shape of other components in accordance with the difference in the shape of the reflecting surface or the shape of the concave mirror. Therefore, the robustness is not necessarily high.

The virtual image display device according to an example of the present application is configured to be mounted on a vehicle. The virtual image display device is configured to cause a projection portion to reflect a display light of an image to display the image as a virtual image to be visible. The virtual image display device includes a display unit and a light guide unit. The display unit is configured to emit the display light. The light guide unit is configured to form an optical path to guide the display light emitted from the display unit toward the projection portion. The light guide unit includes a negative optical element and a positive optical element. The negative optical element is placed on the optical path and having a negative optical power. The positive optical element is placed on the optical path and closer to the projection portion than the negative optical element. The positive optical element has a positive optical power. The positive optical element is a diffractive optical element having a diffractive structure configured to diffract the display light.

According to this example, the positive optical element provided in the light guide unit and having the positive optical power is the diffractive optical element having the diffractive structure that diffracts the display light. The diffractive structure that causes diffraction to produce the positive optical power does not require a curved surface shape in accordance with the shape of the projection potion. Therefore, this configuration enables to commonalize its macroscopic shape among the projection potion in various shapes. As a result, even in a case where the design of the device is changed to enable the device to be mounted on a vehicle including the projection potion having a different shape, change in other components can be minimized.

The negative optical element having the negative optical power is combined with the positive optical element. Therefore, this configuration enables to correct the deformation of image resulting from the shape of the projection potion with high accuracy, regardless of the shape of the projection potion. In the correction of the deformation of image, the positive optical element that is the diffractive optical element enables to adjust the optical characteristics while suppressing change in the macroscopic shape. Therefore, the configuration enables to minimize change in other elements.

As described above, the one aspect enables to produce the virtual image display device that has a high robustness to the shape of the projection portion.

Hereinafter, multiple embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined even if they are not explicitly shown if there is no problem in the combinations in particular.

First Embodiment

As shown in FIG. 1, a virtual image display device according to a first embodiment of the present disclosure is configured to be mounted on a automotive as the vehicle 1. The virtual image display device housed in an instrument panel 2 of the vehicle 1 is a head-up display device (hereinafter referred to as an HUD device) 100. Herein, the wording of "vehicle" is broadly construed to include various vehicles such as an aircraft, a ship, and a game console body, which does not move, in addition to an automotive and a railway vehicle.

The HUD device 100 projects a display light of an image toward the projected portion 3a defined on a windshield 3 of the vehicle 1. In this way, the HUD device 100 displays a virtual image so that the image is visible by an occupant as a viewer of the vehicle 1. In other words, the display light of the image reflected on the windshield 3 reaches a visible region EB defined in the interior of the vehicle 1. An occupant whose eye point EP is located in the visible region EB perceives the display light as a virtual image VI. The occupant is enabled to recognize various types of information displayed as the virtual image VRI. The various types of information, which is displayed as the virtual image, may be exemplified by information that represents a state of the vehicle 1 such as a vehicle speed and/or a remaining fuel. The information may be further exemplified by visibility assisting information and/or navigation information such as road information.

In the following description, unless otherwise noted, the directions indicated by the front, rear, upper, lower, left, and right are denoted with respect to the vehicle 1 on the horizontal plane.

The windshield 3 of the vehicle 1 is formed of, for example, a synthetic resin or a glass to be a translucent plate. The windshield 3 is placed above the instrument panel 2. The windshield 3 is inclined such that the closer to the rear relative to the front, the more the windshield 3 is distant from the instrument panel 2. The windshield 3 has a projected portion 3a on which the display light is projected. The projected portion 3a is in a smooth concave shape or in a planar shape. The projection portion 3a may not be provided on the windshield 3. For example, a combiner, which is a separate component from the vehicle 1, may be placed on an upper surface of the instrument panel 2, and the projected portion 3a may be provided to the combiner.

The visible region EB is a spatial region that is visually recognizable such that the virtual image VRI displayed by the HUD device 100 satisfies a predetermined standard in a case where, for example, the entirety of the virtual image VRI has a predetermined luminance or higher. The visible region EB is also referred to as an eye box. Typically, the visual recognition region EB is defined so as to overlap with an eyelips that is defined in the vehicle 1. The eyelips is in an ellipsoidal form defined based on an eye range that statistically represents a spatial distribution of the eye point EP of an occupant.

The detailed configuration of the HUD device 100 will be described below with reference to FIG. 2 additionally. The HUD device 100 is includes a case 10, the display unit 20, a light guide unit 30, and the like.

The case 10 is in a hollow box shape and is constructed of a case wall 11 formed of, for example, a synthetic resin having a light shielding property. The case 10 accommodates and holds the display unit 20, a control circuit board for controlling the display unit 20, the light guide unit 30, and the like. The case 10 of the present embodiment is commonalized among multiple vehicle types that are different in shapes of the projection potion 3a.

An upper part of the case 10 that faces the projection part 3a in the vertical direction has a window portion 12 on the front side. The window portion 12 is optically opened for transmitting the display light. The window portion 12 may be physically open or may be covered with a translucent dust-proof sheet that is in a thin plate shape. The rear side of the upper part is closed with the case wall 11 of the case 10.

The display unit 20 displays the image to be formed as the virtual image VRI. The display unit 20 may employ various types of displays, such as a liquid crystal display, an EL display, a laser scanner display, or a digital light processing display (DLP display (registered trademark)). The liquid crystal display displays an image by using a transmissive or reflective liquid crystal panel. The EL display emits light by itself by causing electroluminescence. The DLP display uses a digital micromirror device (DMD). In particular, the display unit 20 of the present embodiment displays a color image composed of multiple colors and emits a display light, in which, for example, a red light, a green light, a blue light, and the like are combined, to the light guide unit 30. The display unit 20 may be configured to emit a display light that is a white light including wavelengths in a visible range and may display a monochromatic image with the white light.

The display unit 20 of the present embodiment is placed at the rearmost position in the case 10 and emits the display light toward the front.

The light guide unit 30 forms an optical path that guides the display light emitted from the display unit 20 toward the projected portion 3a outside the device. The light guide unit 30 of the present embodiment includes the negative optical element 32 that is negative in optical power. The light guide unit 30 further includes the positive optical element 34 that is positive in optical power and is placed closer to the projection potion 3a than the negative optical element 32 on the optical path.

Figure 3:
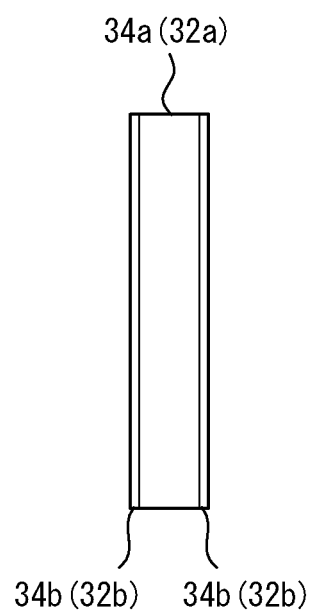
FIG. 3 is a view schematic showing a configuration of a positive optical element or a negative optical element according to the first embodiment.

In the present embodiment, both the negative optical element 32 and the positive optical element 34 are diffractive optical elements each having a diffractive structure configured to diffract the display light. More specifically, the negative optical element 32 and the positive optical element 34 are optical elements each having a periodic refractive index distribution in its medium. As shown in FIG. 3, each of the negative optical element 32 and the positive optical element 34 is a volume-type hologram element in a thin plate shape, particularly in a flat plate shape. The negative optical element 32 is formed, by sandwiching a hologram layer 32a with a pair of transmission substrate layers 32b. The positive optical element 34 is formed, by sandwiching a hologram layer 34a with a pair of transmission substrate layers 34b. The periodic refractive index distribution in the hologram layers 32a and 34a contribute to the diffractive structure.

The transmission substrate layers 32b and 34b are formed of, for example, a synthetic resin or a glass in thin plate shapes having a light transmitting property and protect and reinforce the hologram layers 32a and 34a.

The hologram layers 32a and 34a are formed in advance in a state where information of an amplitude and a phase of an object light is recorded as interference fringes with respect to a reference light in a hologram material. These interference fringes are caused by the above-described periodic refractive index distribution. The hologram material may be a material mainly composed of a synthetic resin, a gelatin photosensitive material, or a silver salt photosensitive material, or the like. The hologram material may be a material enabled to selectively record information of the amplitude and the phase of the object light by using a spatial modulation of the refractive index.

The negative optical element 32 is a transmissive hologram element. In the hologram layer 32a of the negative optical element 32, the interference fringes are configured to transmit the display light and to diffuse the display light by diffraction. For this diffraction, a first-order diffracted light (hereinafter referred to as a first-order light) having the highest diffraction efficiency is mainly used.

Figure 4:
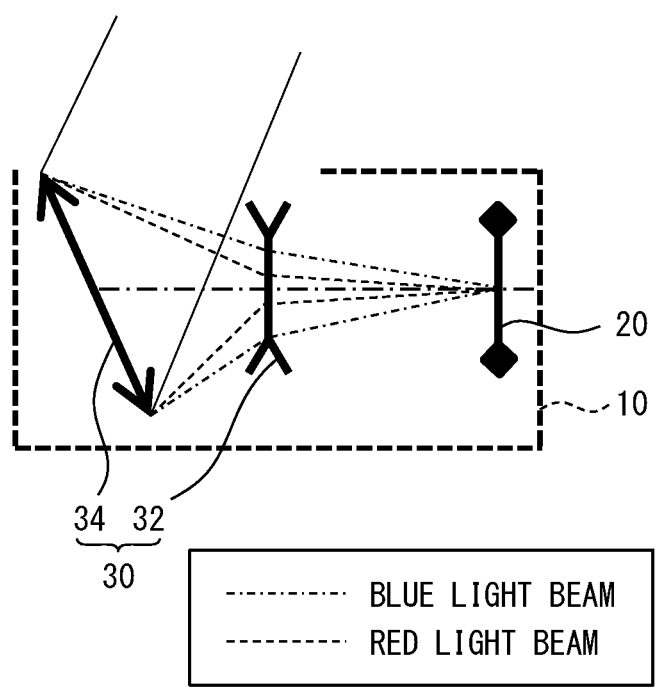
FIG. 4 is an explanatory view showing color shift in the first embodiment.

As shown in FIG. 4, the negative optical element 32, which produces the negative optical power by using a primary light, causes chromatic dispersion in a direction opposite to that of a concave refractive lens that causes normal dispersion with respect to a visible light. That is, the magnitude of the deflection angle due to the diffraction caused by the negative optical element 32 acts larger on the light beam with a long wavelength than the light beam with a short wavelength. Herein, the optical power of the negative optical element 32 is defined as 1/f1, and the chromatic dispersion coefficient is defined as v1.

In the present embodiment, the negative optical element 32 is placed on the front side of the display unit 20 and on the rear side of the positive optical element 34. The negative optical element 32 allows the display light to be incident through a surface 32c that faces to the rear side. The negative optical element 32 further allows the display light to be emitted through the surface 32d that faces to the front side toward the positive optical element 34.

The positive optical element 34 is a reflection type hologram element. In the hologram layer 34a of the positive optical element 34, interference fringes that condense, diffract, and reflect the display light are formed. For this diffraction, a primary light having the highest diffraction efficiency is mainly used.

The positive optical element 34 that produces the positive optical power by using the primary light causes chromatic dispersion in the direction opposite to that of a convex refractive lens that causes normal dispersion with respect to visible light. That is, the magnitude of the deflection angle due to the diffraction caused by the positive optical element 34 acts larger on the light beam with a long wavelength than the light beam with a short wavelength. Herein, the optical power of the positive optical element 34 is defined as 1/f2, and the chromatic dispersion coefficient is defined as v2.

As shown in FIG. 1, in the present embodiment, the positive optical element 34 is placed on the foremost side in the case 10, and a surface 34c, which allows the display light to be incident, is directed to the rear side and to the upper side. The primary light of the display light, which is incident from the negative optical element 32 toward the positive optical element 34, is diffracted and reflected toward the projection potion 3a. Among the display light incident from the negative optical element 32 to the positive optical element 34, the display light (hereinafter referred to as 0th-order light) is reflected by the surface 34c of the positive optical element 34 without being affected by diffraction. The 0th-order light is directed through the window portion 12 in a direction toward a region other than the projected portion 3a and the visible region EB outside the device. The transmission substrate layers 34b other than the surface 34c to which the display light is incident may be applied with light shielding.

A combined power of the light guide unit 30, i. e, the optical power of the entirety of the light guide unit 30, is 1/f that is given by the following Equation 1.

$$1/f = 1/f1 + 1/f2 \quad \text{(Equation 1)}$$

The combined power 1/f is preferably positive (ie, 1/f>0). In a case where the combined power of the light guide unit 30 is positive, the size of the virtual image VRI can be enlarged relative to the size of the real image displayed on the display unit 20.

Further, as shown in FIG. 4, the direction of the color shift that is caused due to the difference in the deflection angle and caused by the diffraction in the negative optical element 32 is opposite to that in the positive optical element 34. Therefore, the color shift is in part offset to each other. That is, chromatic aberration can be reduced by bringing the value shown in the following Equation 2 close to zero.

$$1/(v1 \cdot f1) + 1/(v2 \cdot f2) \quad \text{(Equation 2)}$$

The deformation of image caused in the virtual image VRI may be caused according to the shape of the projection potion 3a and according to the form of the interference fringes in the negative optical element 32 and the positive optical element 34.

In an assumable configuration, the shape of the projection potion 3a is concave. In this assumable configuration, only the positive optical element 34 is provided in the light guide unit 30, and the negative optical element 32 is not provided in the light guide unit 30. In this assumable configuration, the interference fringes in the positive optical element 34 gives, according to its function, an optical path length to the light diffracted at a center part around the axis of the positive optical element 34 longer than an optical path length of the light, which is diffracted and reflected on a peripheral portion in the outer periphery of the positive optical element 34. It is noted that, this optical path difference sufficiently larger in length than the wavelength. The deformation of image caused by the concave shape of the projection potion 3a is a deformation such that the center portion is concaved. Therefore, the positive optical element 34 could act not to correct the deformation of image but to promote the deformation of image.

To the contrary, according to the present embodiment, the negative optical element 32 is provided in the light guide unit 30. Therefore, the interference fringes in the negative optical element 32 is enabled to reduce the difference in the optical path caused in the positive optical element 34. Therefore, the present embodiment enables to facilitate the correction of the deformation of image and to enable to produce the virtual image VRI which is suppressed in deformation.

Moreover, the configuration of the present embodiment enables to reduce the optical path length on the side of the display unit 20 relative to the positive optical element 34, compared with a configuration which is provided with only the positive optical element 34 in the light guide unit 30 and which produces the same combined power 1/f. Therefore, the configuration enables to downsize the HUD device 100. In this way, the HUD device 100 is downsized.

Figure 2:
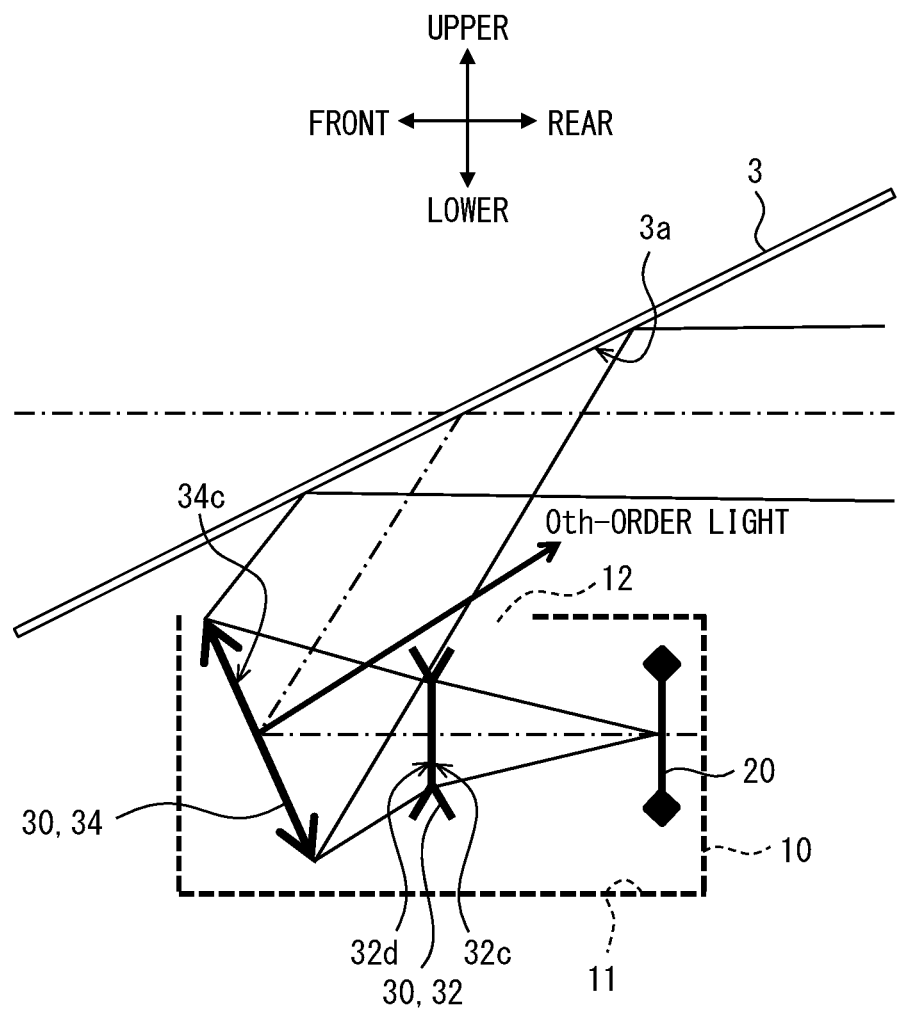
FIG. 2 is a schematic view showing a configuration of an HUD device according to the first embodiment.

FIGS. 2 and 4 schematically illustrates the display unit 20 with a symbol in which squares are added to both ends of a straight line which is along a screen. The negative optical element 32 is schematically illustrated with a symbol in which both ends of a straight line along the surfaces 32c and 32d are in a Y-shape. The positive optical element 34 is schematically illustrated with a symbol in which arrows are added to both ends of a straight line which is along the surface 34c.

(Operation Effect)

The operation effect of the first embodiment as described above will be described below.

According to the first embodiment, the positive optical element 34 provided in the light guide unit 30 and having the positive optical power is a diffractive optical element having the diffractive structure that diffracts the display light. The diffractive structure that causes diffraction to produce the positive optical power does not require a curved surface shape in accordance with the shape of the projection potion 3a. Therefore, this configuration enables to commonalize its macroscopic shape among the projection potion 3a in various shapes. As a result, even in a case where the design of the HUD device 100 is changed to enable the HUD device 100 to be mounted on a vehicle including the projection potion 3a having a different shape, change in other components can be minimized.

The negative optical element 32 having the negative optical power is combined with the positive optical element 34. Therefore, this configuration enables to correct the deformation of image resulting from the shape of the projection potion 3a with high accuracy, regardless of the shape of the projection potion 3a. In the correction of the deformation of image, the positive optical element 34 that is the diffractive optical element enables to adjust the optical characteristics while suppressing change in the macroscopic shape. Therefore, the configuration enables to minimize change in other elements.

As described above, the present embodiment enables to provide the HUD device 100 as the virtual image display device having high robustness to the shape of the projection potion 3a.

Further, according to the first embodiment, the negative optical element 32 is the diffractive optical element having the diffractive structure that diffracts the display light to cause the color shift in the direction opposite to the direction of the color shift of the positive optical element 34. The negative optical element 32 is also the diffractive optical element. Therefore, even in the case where the positive optical element 34 is the diffractive optical element, the configuration enables to cancel the color shift, thereby to enhance the robustness to the shape of the projection potion 3a and to produce the virtual image VRI which is high in visibility.

Further, according to the first embodiment, one of the positive optical element 34 and the negative optical element 32 diffracts and reflects the display light. The light guide unit 30 causing the diffraction and reflection does not require to arrange the display unit 20 and the projection potion 3a in straight and enables the case 10 to be in a shape that facilitates the case 10 to be mounted on the vehicle 1. Therefore, the configuration enables to enhance the robustness.

Further, according to the first embodiment, the positive optical element 34 guides the primary light of the display light toward the projection potion 3a and emits the zero-order light in a direction other than the direction toward the projection potion 3a and the visible region EB outside the device. The configuration emits the zero-order light in the direction other than the direction toward the projection potion 3a and the viewing area EB. Therefore, the configuration restricts the zero-order light from being incident on the eye of the viewer who visually recognizes the virtual image VRI. That is, the virtual image VRI formed by the primary light, which is reflected by the projection potion 3a, is hardly influenced by the zero-order light. Therefore, the configuration enables to produce the virtual image VRI high in visibility.

Second Embodiment

Figure 5:
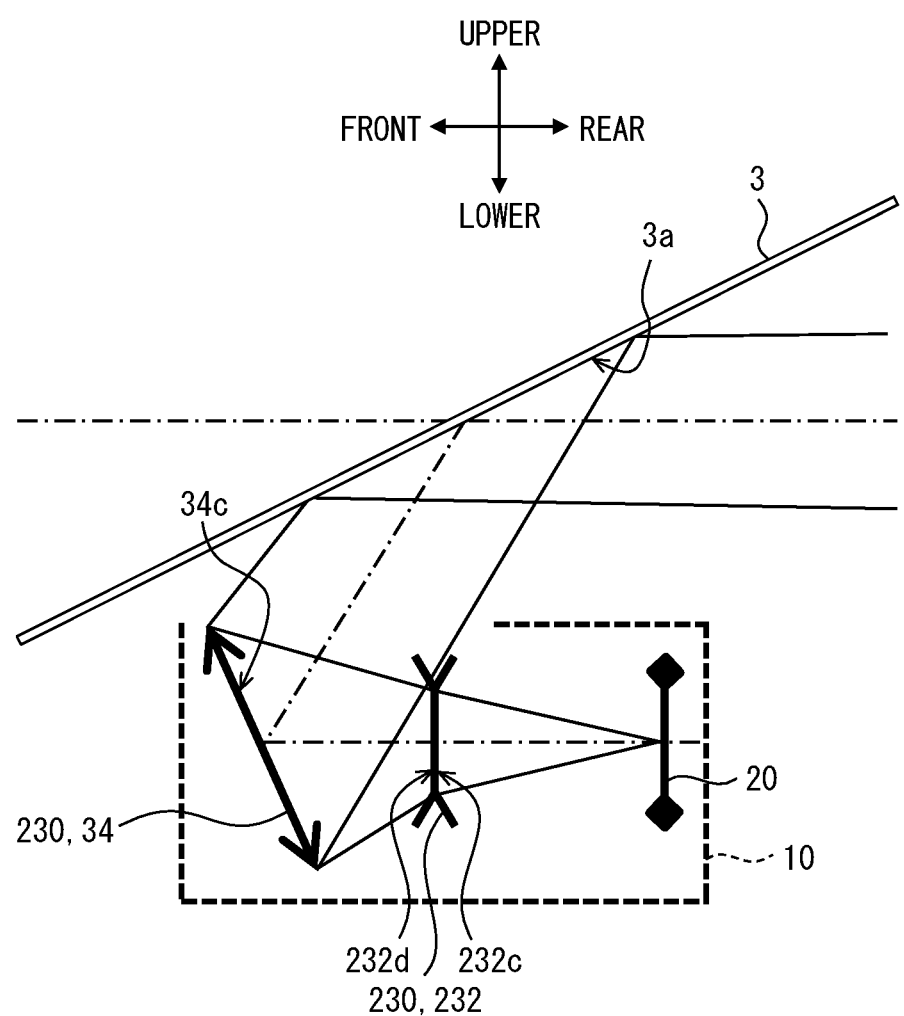
FIG. 5 is a schematic view showing a configuration of an HUD device according to a second embodiment.

As shown in FIG. 5, a second embodiment is a modification of the first embodiment. The second embodiment will be described mainly on configurations different from those of the first embodiment.

In the light guide 230 of the second embodiment, the negative optical element 232 is not the diffractive optical element. The negative optical element 232 is translucent and is made of, for example, a synthetic resin or a glass that exhibits normal dispersion with respect to a visible light. The negative optical element 232 is a lens that transmits a light while refracting light on surfaces 232c and 232d.

More specifically, the negative optical element 232 has a negative optical power and is a concave lens that refracts and diffuses the display light. The negative optical element 232, which is the concave lens, may employ a biconcave lens, a planoconcave lens, or a concave meniscus lens.

According to the second embodiment as described above, the negative optical element 232 is the lens that refracts the display light. The refractive lens can be prepared more easily than the diffractive optical element. Therefore, the configuration is advantageous in enhancing the robustness to the shape of the projection potion 3a.

Third Embodiment

Figure 6:
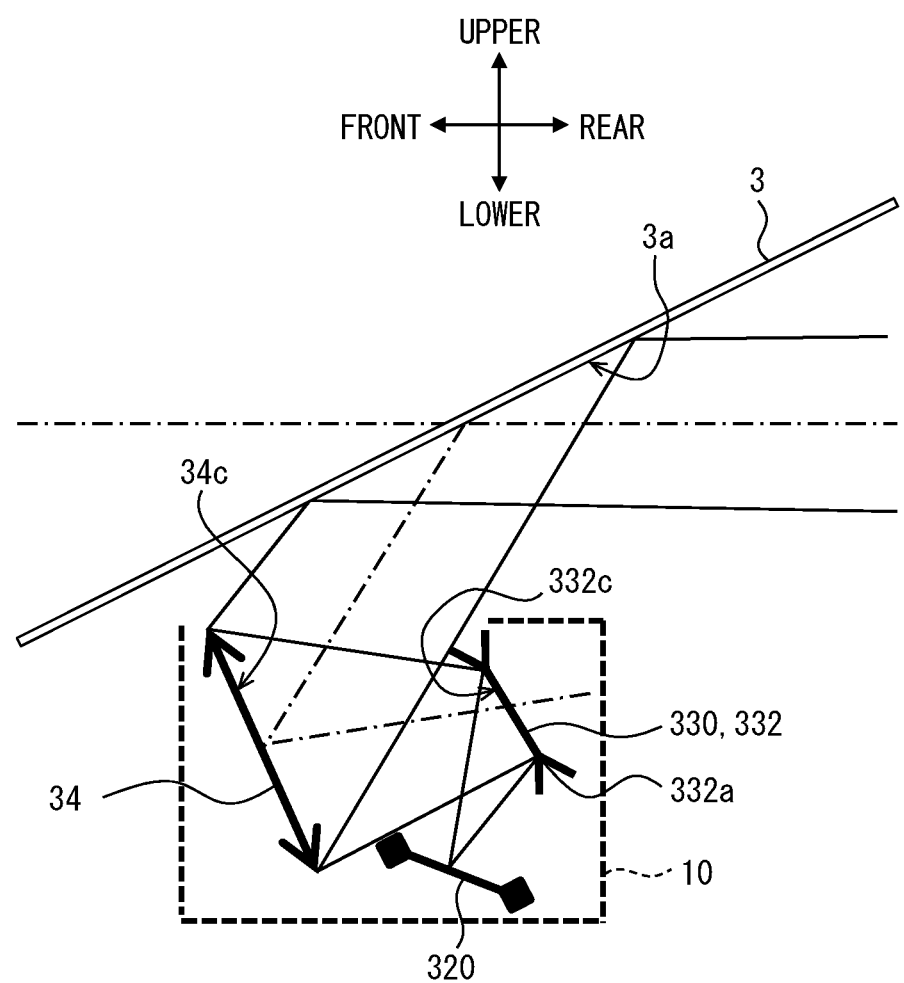
FIG. 6 is a schematic view showing a configuration of an HUD device according to a third embodiment.

As shown in FIG. 6, a third embodiment is a modification of the first embodiment. The third embodiment will be described mainly on configurations different from those of the first embodiment.

A display unit 320 of the third embodiment is placed on the rear side in the case 10 and emits the display light toward the upper side. With respect to the display unit 320, the negative optical element 332 of the light guide 330 is a reflection type hologram element.

In a hologram layer 332a of the negative optical element 332, interference fringes that diffuse, diffract, and reflect the display light are formed. For this diffraction, the primary light having the highest diffraction efficiency is mainly used. The negative optical element 332 of the third embodiment also produces chromatic dispersion similar to that of the negative optical element 32 of the first embodiment.

In addition, the negative optical element 332 is placed on the upper side of the display unit 320, and a surface 332c which allows the display light to be incident is directed to the front side and to the lower side. The negative optical element 332 emits the display light which is incident from the display unit 320 toward the positive optical element 34.

According to the third embodiment as described above, both the positive optical element 34 and the negative optical element 32 diffract and reflect the display light. The optical elements 34 and 332 causing diffraction and reflection enables to set the reflection direction of the display light freely. Therefore, arrangement of the display unit 320, the negative optical element 332, and the positive optical element 34 can be further freely made. As a result, the configuration enables the case 10 to be in a shape easily mounted on the vehicle 1 and to enhance the robustness.

Fourth Embodiment

Figure 7:
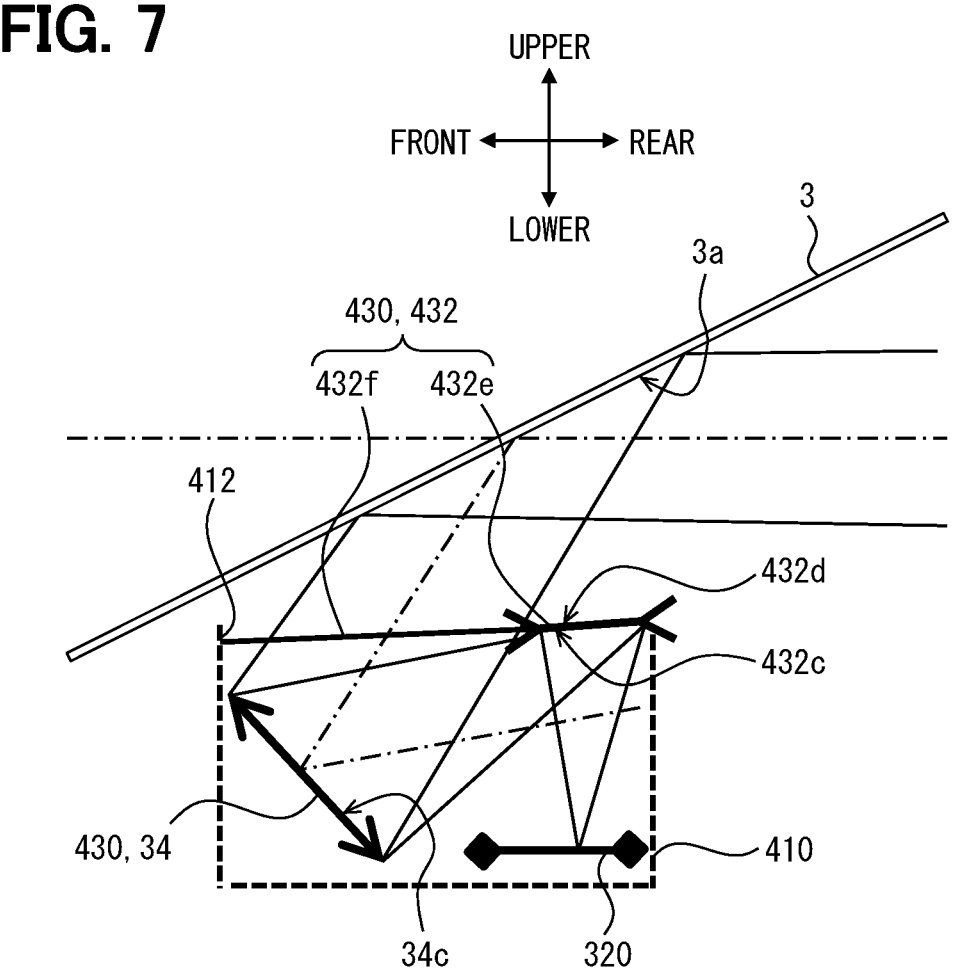
FIG. 7 is a schematic view showing a configuration of an HUD device according to a fourth embodiment.
Figure 8:
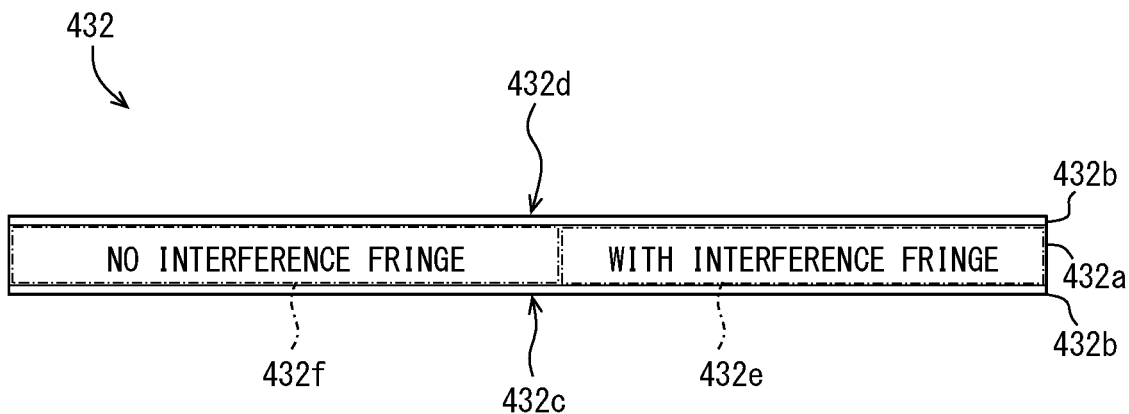
FIG. 8 is a schematic view showing a configuration of a negative optical element according to the fourth embodiment.

As shown in FIGS. 7 and 8, a fourth embodiment is a modification of the first embodiment. The fourth embodiment will be described mainly on configurations different from those of the first embodiment.

As shown in FIG. 7, a case 410 of the fourth embodiment has a window portion 412 which is an opening substantially in its entirety of the upper portion. The case 410 accommodates the display unit 320 and the positive optical element 34. Similarly to the third embodiment, a display unit 420 of the fourth embodiment is placed on the rear side in the case 410 and emits the display light toward the upper side.

In the light guide unit 430 of the fourth embodiment, the negative optical element 432 is formed in a plate shape, in particular in a flat plate shape, which covers the entirety of the window portion 412. The negative optical element 432 has a surface 432c facing to the lower side and a surface 432d facing to the upper side. The negative optical element 432 is a hologram element having a structure in which a hologram layer 432a is sandwiched between a pair of transmission substrate layers 432b as in the first embodiment. The negative optical element 432 integrally includes a diffractive and reflective part 432e and a transmissive part 432f (see FIG. 8).

The diffractive and reflective part 432e is placed on the rear side in the window portion 412, that is, the diffractive and reflective part 432e is placed at a portion facing the display unit 320 in the vertical direction. The diffractive and reflective part 432e has interference fringes that diffuse, diffract, and reflect the display light in the hologram layer 432a. The diffractive reflective portion 432e having the interference fringes exhibits a diffractive and reflective function similar to that of the negative optical element 332 of the third embodiment.

Herein, the surface 432c of the diffractive reflective portion 432e faces to the lower side and thereby to face the display unit 320. It is noted that, the diffractive and reflective part 432e enables to diffract and reflect the primary light at a predetermined reflection angle with respect to the display light which is incident from the display unit 320 to the surface 432c substantially perpendicularly. The display light which has been diffracted and reflected in this way is emitted from the surface 432c toward the positive optical element 34.

The transmissive part 432f is placed on the front side in the window portion 412 at a position to face the positive optical element 34 in the vertical direction. The transmissive part 432f is formed in the hologram layer 432a. The transmissive part 432f is formed without the interference fringes and has a substantially uniform refractive index.

Therefore, the display light which is incident on the positive optical element 34 from the diffractive and reflective part 432e and is diffracted and reflected by the positive optical element 34 toward the projection portion 3a is transmitted through the transmissive part 432f and is emitted to the outside of the device. In this way, the negative optical element 432 bears a part of the function to guide the display light to the projection potion 3a and to protect the HUD device 100 from foreign matter and the like outside the device.

Further, in the present embodiment, the diffractive and reflective part 432e and the transmissive part 432f are integrally formed as the unified singular hologram element. This configuration is materialized by exposing only a part of the hologram element, which corresponds to the diffractive and reflective part 432e, to an object light and a reference light thereby to form interference fringes.

According to the fourth embodiment as described above, the negative optical element 432 integrally includes the diffractive and reflective part 432e and the transmissive part 432f. The diffractive and reflective part 432e is placed at a position facing the display unit 320. The diffractive and reflective part 432e diffracts and reflects the display light from the display unit 320 toward the positive optical element 34. The negative optical element 432 bears a part of a function to guide the display light toward the projected portion 3a by using the diffractive and reflective part 432e. The transmissive part 432f is placed at a position facing the positive optical element 34. The display light is incident from the diffractive and reflective part 432e to the positive optical element 34 and is diffracted and reflected on the positive optical element 34 toward the projection potion 3a. The transmissive part 432f causes the display light to pass therethrough. The negative optical element 432 blocks the window portion 412 of the case 410 thereby to protect the HUD device 100 from foreign matter and the like outside the device, while transmitting the display light to the projection portion 3a therethrough by using the transmissive part 432f.

Fifth Embodiment

Figure 9:
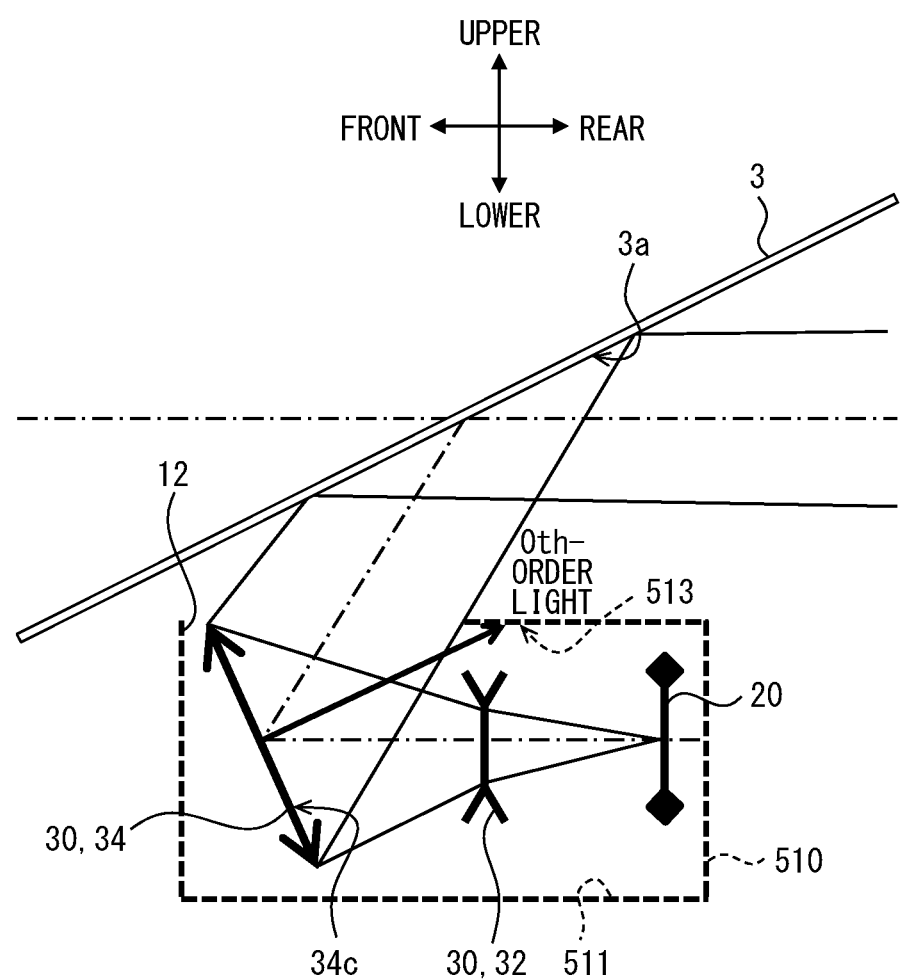
FIG. 9 is a schematic view showing a configuration of an HUD device according to a fifth embodiment.

As shown in FIG. 9, a fifth embodiment is a modification of the first embodiment. The fifth embodiment will be described mainly on configurations different from those of the first embodiment.

A case 510 of the fifth embodiment includes a case wall 511. An absorption part 513 is provided inside the case wall 511. The absorption part 513 absorbs the display light. The absorption part 513 is formed, for example, by embossing to roughen the inner surface of the case wall 511, by affixing a felt to the inner surface of the case wall 511, or by applying a paint that absorbs the display light on the inner surface of the case wall 511.

In the fifth embodiment, among the display light, which has been transmitted through the negative optical element 32 and incident on the positive optical element 34, the display light (that is, the 0th-order light) reflected on the surface 34c of the positive optical element 34 is reflected toward the absorption part 513.

According to the fifth embodiment as described above, the positive optical element 34 guides the primary light among the display light, which has been incident on the positive optical element 34, toward the projection portion 3a and emits the zero-order light toward the absorption part

513. The absorption of the zero-order light by the absorption part 513 suppresses incidence of the zero-order light to the eyes of the viewer who visually recognizes the virtual image VRI. That is, the virtual image VRI formed by the primary light, which is reflected by the projection potion 3*a*, is hardly influenced by the zero-order light. Therefore, the configuration enables to produce the virtual image VRI high in visibility.

Other Embodiments

Although multiple embodiments have been described above, the present disclosure is not construed as being limited to these embodiments, and can be applied to various embodiments and combinations within a scope that does not depart from the gist of the present disclosure.

Specifically, according to a first modification, the positive optical element 34 may be a transmissive hologram element.

According to a second modification, the diffractive optical element used for the positive optical element 34 or the like may not be a hologram element produced by exposure to light. For example, the diffractive optical element may be an element that has a refractive index distribution in a medium produced by a method other than the exposure to light. In addition, the diffractive optical element may be materialized with, for example, a grating configuration having a mechanical structure having, for example, protrusions and recesses.

According to a third modification, the positive optical element 34 may be formed in a curved plate shape, other than the flat plate shape, having, for example, a smooth curved surface 34*c*.

According to a fourth modification, in the positive optical element 34, the emission direction of the primary light may coincide with the emission direction of the zero-order light.

According to a fifth modification related to the second embodiment, the negative optical element 232 may be a refractive lens formed of fluorite or anomalous dispersion glass in order to correct chromatic aberration of magnification.

According to a sixth modification related to the fourth embodiment, the negative optical element 432 may be formed in a curved plate shape having a smooth curved surface 432*c*.

According to a seventh modification related to the fourth embodiment, interference fringes may be formed in the hologram layer 432*a* that is a part of the transmissive part 432*f*. According to an example, interference fringes that condense the display light as its transmission progresses are formed in the transmissive part 432*f*. The configuration enables to enlarge the size of virtual image VRI with respect to the case 10 and to form the virtual image VRI at a position farther from the visible region EB. According to another example, interference fringes that deflect the display light as its transmission progresses are formed in the transmissive part 432*f*. In this configuration, the incident and reflection angle of the projection part 3*a* may be adjusted to an angle of high reflectance such as Brewster's angle.

According to a modification 8, a lens, a mirror, a prism, a polarizing plate, a retardation plate, an optical filter or the like may be added to the light guide unit 30.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A virtual image display device configured to be mounted on a vehicle and to cause a projection portion to reflect a display light of an image to display the image as a virtual image to be visible, the virtual image display device comprising:
   a display configured to emit the display light; and
   a light guide unit configured to form an optical path to guide the display light emitted from the display toward the projection portion,
   wherein
   the light guide unit includes:
      a negative optical element placed on the optical path and having a negative optical power; and
      a positive optical element placed on the optical path and closer to the projection portion than the negative optical element, wherein
   the positive optical element has a positive optical power,
   the positive optical element is a diffractive optical element having a diffractive structure configured to diffract the display light, and
   the negative optical element is a diffractive optical element having a diffractive structure configured
      to cause a color shift in a direction opposite to a direction of a color shift caused by a chromatic aberration of magnification of the positive optical element and
      to diffract the display light.

2. The virtual image display device according to claim 1, further comprising:
   a case accommodating the display unit and the positive optical element and having a window portion opening between the positive optical element and the projection portion, wherein
   the negative optical element is in a plate shape and closes the window portion,
   the negative optical element includes:
      a diffractive and reflective optical segment placed at a position facing the display and configured to diffract and reflect the display light from the display toward the positive optical element; and
      a transmissive optical segment placed at a position facing the positive optical element and configured to transmit the display light, which is incident from the diffractive and reflective optical segment to the positive optical element and is diffracted and reflected by the positive optical element toward the projection portion, and
   the diffractive and reflective optical segment and the transmissive optical segment are integrated with each other.

3. The virtual image display device according to claim 1, wherein
   the negative optical element is a hologram element.

4. The virtual image display device according to claim 1, wherein
the negative optical element is a lens configured to refract the display light.

5. The virtual image display device according to claim 1, wherein
one of the positive optical element and the negative optical element is configured to diffract and reflect the display light.

6. The virtual image display device according to claim 1, wherein
both the positive optical element and the negative optical element are configured to diffract and reflect the display light.

7. A virtual image display device configured to be mounted on a vehicle and to cause a projection portion to reflect a display light of an image to display the image as a virtual image to be visible, the virtual image display device comprising:
   a display configured to emit the display light;
   a light guide unit configured to form an optical path to guide the display light emitted from the display toward the projection portion; and
   an absorber configured to absorb the display light, wherein
   the light guide unit includes:
      a negative optical element placed on the optical path and having a negative optical power; and
      a positive optical element placed on the optical path and closer to the projection portion than the negative optical element, wherein
   the positive optical element has a positive optical power,
   the positive optical element is a diffractive optical element having a diffractive structure configured to diffract the display light, and
   the positive optical element is configured
      to guide a primary light among the display light, which is incident on the positive optical element, toward the projection portion and
      to emit a zero-order light among the display light toward the absorber.

8. A virtual image display device configured to be mounted on a vehicle and to cause a projection portion to reflect a display light of an image to display the image as a virtual image to be visible, the virtual image display device comprising:
   a display configured to emit the display light; and
   a light guide unit configured to form an optical path to guide the display light emitted from the display toward the projection portion,
   wherein
   the light guide unit includes:
      a negative optical element placed on the optical path and having a negative optical power; and
      a positive optical element placed on the optical path and closer to the projection portion than the negative optical element, wherein
   the positive optical element has a positive optical power,
   the positive optical element is a diffractive optical element having a diffractive structure configured to diffract the display light, and
   the positive optical element is configured
      to guide a primary light among the display light, which is incident on the positive optical element, toward the projection portion and
      to emit a zero-order light among the display light in a direction toward an outside of the virtual image display device other than the projection portion and the visible region where the virtual image is visible.

* * * * *